United States Patent
Valeri et al.

(10) Patent No.: US 11,752,713 B2
(45) Date of Patent: Sep. 12, 2023

(54) POLYMER COMPOSITION AND METHODS USING SAID POLYMER COMPOSITION TO MANUFACTURE OPHTHALMIC LENS

(71) Applicant: ESSILOR INTERNATIONAL, Charenton-le-Pont (FR)

(72) Inventors: Robert Valeri, Dallas, TX (US); John Biteau, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 222 days.

(21) Appl. No.: 17/066,145

(22) Filed: Oct. 8, 2020

(65) Prior Publication Data

US 2021/0072425 A1 Mar. 11, 2021

Related U.S. Application Data

(62) Division of application No. 15/106,617, filed as application No. PCT/IB2013/003007 on Dec. 20, 2013, now abandoned.

(51) Int. Cl.

| | |
|---|---|
| B29D 11/00 | (2006.01) |
| B33Y 10/00 | (2015.01) |
| G02B 1/04 | (2006.01) |
| B29C 64/112 | (2017.01) |
| B29C 64/135 | (2017.01) |
| B33Y 70/00 | (2020.01) |
| B33Y 80/00 | (2015.01) |
| B29C 37/00 | (2006.01) |
| G02C 7/02 | (2006.01) |
| B29K 63/00 | (2006.01) |
| B29K 69/00 | (2006.01) |
| B29K 105/00 | (2006.01) |
| B29L 11/00 | (2006.01) |

(52) U.S. Cl.
CPC .... B29D 11/00442 (2013.01); B29C 37/0025 (2013.01); B29C 64/112 (2017.08); B29C 64/135 (2017.08); B29D 11/00028 (2013.01); B29D 11/0048 (2013.01); B33Y 10/00 (2014.12); B33Y 70/00 (2014.12); B33Y 80/00 (2014.12); G02B 1/041 (2013.01); G02B 1/043 (2013.01); B29K 2063/00 (2013.01); B29K 2069/00 (2013.01); B29K 2105/0014 (2013.01); B29L 2011/0016 (2013.01); G02C 7/022 (2013.01)

(58) Field of Classification Search
CPC ........ B29D 11/00442; B29D 11/00028; B29D 11/0048; B29C 64/112; B29C 64/135; B29C 37/0025; B33Y 10/00; B33Y 70/00; B33Y 80/00
See application file for complete search history.

(56) References Cited

U.S. PATENT DOCUMENTS

| | | | |
|---|---|---|---|
| 5,583,191 A | 12/1996 | Kawai et al. | |
| 5,662,839 A | 9/1997 | Magne | |
| 6,235,856 B1 | 5/2001 | Hafner et al. | |
| 6,307,062 B1 | 10/2001 | Caye et al. | |
| 6,734,313 B2 * | 5/2004 | Seemayer | C07D 493/04 568/591 |
| 7,420,743 B2 * | 9/2008 | Lai | G02B 3/0087 427/164 |
| 2006/0022176 A1 | 2/2006 | Wang et al. | |

FOREIGN PATENT DOCUMENTS

| | | |
|---|---|---|
| EP | 1550679 | 7/2005 |
| WO | WO 1995/011219 | 4/1995 |
| WO | WO 03/016030 * | 2/2003 |
| WO | WO 2003/016030 | 2/2003 |
| WO | WO 2008/127930 | 10/2008 |

OTHER PUBLICATIONS

Cohen et al., "Monomers Which Expand on Polymerization", *Conference proceedings/RADCURE* '84, pp. 11-1-11-12, 1984.
International Search Report and Written Opinion issued in PCT/IB2013/003007, dated Aug. 14, 2014.
Ortiz, et al., "Novel Tetraspiroorthocarbonates as Successful Anti-Shrinking Agents for the Photopolymerization of Epoxy Monomers," *Journal of Macromolecular Science Part A*, 49:361-368, 2012.
Smith et al., "Photopolymerization of an Expanding Monomer with an Aromatic Dioxirane" *Journal of Applied Polymer Science* 2004, 92, 62-71.

* cited by examiner

*Primary Examiner* — Mathieu D Vargot
(74) *Attorney, Agent, or Firm* — Norton Rose Fulbright US LLP

(57) ABSTRACT

The present invention proposes a polymer composition of manufacturing ophthalmic lens by polymerization of polymerizable composition wherein the shrinkage phenomenon is minimized. The polymerizable composition comprised two different categories of monomers which are able during crosslinking to control and limit said chemical shrinkage. The present invention comprises also ophthalmic lens obtained from said polymer composition using a manufacturing process of casting or additive manufacturing.

20 Claims, No Drawings

POLYMER COMPOSITION AND METHODS USING SAID POLYMER COMPOSITION TO MANUFACTURE OPHTHALMIC LENS

CROSS-REFERENCE TO RELATED APPLICATIONS

This application is a divisional application of U.S. application Ser. No. 15/106,617, filed Jun. 20, 2016 now abandoned, which is a national phase application under 35 U.S.C. § 371 of International Application No. PCT/IB2013/003007 filed Dec. 20, 2013. The entire contents of the aforementioned applications are incorporated by reference herein without disclaimer.

TECHNICAL FIELD

The present invention relates to polymer composition of manufacturing ophthalmic lens, to methods of manufacturing an ophthalmic lens comprising said polymer composition and to ophthalmic lens obtained by said methods.

BACKGROUND

Plastic ophthalmic lenses are well known and have a common usage. Today there are two main categories of plastic lenses, the first wherein plastic represents a thermoplastic polymer, and the second wherein plastic represents a thermoset polymer resulting from the polymerization of a polymerizable composition comprising monomer and/or oligomer which are able to polymerize under actinic or thermal activation to form a polymer.

Usually in the ophthalmic field, thermoplastic lenses are obtained through an injection process and thermosetting lenses are obtained through a casting process. Thermosetting polymer represents a polymer network formed by the chemical reaction of monomers, at least one of which has two or more reactive groups per molecule (that means a functionality equal to or higher than two), and that presents in relative amounts such that a gel is formed as a particular conversion during the synthesis. In a symbolic form, it may be stated that a threshold polymer is obtained by the homopolymerization of an Af molecule (wherein f superior or equal to 2, and represents the number of functional/reactive group per molecule A), or the polymerization of an Af molecule by reaction with a Bg molecule, and they are present in a particular ratio such that a gel will be formed.

Then polymer network is formed in an irreversible way, the synthesis of a thermosetting polymer is carried out to produce final material with the desired shape. Therefore, polymer and final shaping are performed in the same process. This represents a disadvantage in the ophthalmic industry. In fact, to manufacture a lens of thermosetting material, monomers used to obtaine such material are casted between two molds having the required surface geometries. The number of combination of surface geometries needed in the ophthalmic lens is too broad to have one specific mold for one specific lens in accordance with the prescription of a wearer, and/or in accordance with the geometry of the frame wherein said lens will be mounted. So in the traditional process, ophthalmic lens are manufactured through a subtractive process, wherein firstly the lens is casted has a round shape as a semi-finished lens or finished lens, and then this round shape submit various steps like surfacing and edging to provide a final lens (with less polymer material than the initial lens round shape) adapted to the prescription of a wearer and adapted to be mounted to a frame choice by said wearer. So part of initial thermosetting material is loss and this consumption of material represent economical and environment issue.

Additive Manufacturing methods and devices have become well-known in various industries for production of parts and products formerly manufactured using subtractive manufacturing techniques, such as traditional machining. Application of such manufacturing methods has not been systematically applied.

By additive manufacturing it means a manufacturing technology as defined in the international standard ASTM 2792-12, which mentions a process of joining materials to make objects from 3D model data, usually layer upon layer, as opposed to subtractive manufacturing methodologies, such as traditional machining.

The additive manufacturing method may be selected in, but is not limited to, the list consisting of stereolithography, mask stereolithography or mask projection stereolithography, polymer jetting, scanning laser sintering or SLS, scanning laser melting or SLM, fused deposition modeling or FDM.

Additive manufacturing technologies comprise processes which create objects by juxtaposition of volume elements according to a pre-determined arrangement that can be defined in a CAD (Computer Aided Design) file. Such juxtaposition is understood as the result of sequential operations such as building a material layer on top of a previously obtained material layer and/or juxtaposing a material volume element next to a previously obtained volume element.

The primary advantage of this technique is its ability to create almost any shape or geometric feature. Advantageously, using such additive manufacturing methods provides much more freedom during the determining step.

So this is an object of the invention to provide a polymer composition to manufacture transparent ophthalmic lens by polymerization of a polymerizable composition comprising at least a monomer or oligomer (A) and a monomer (B), said composition being able to be used to a traditional casting process using two molds or to an additive manufacturing process, more specifically to a stereolithography, mask stereolithography, mask projection stereolithography, or polymer jetting, using a 3D printing device.

Another disadvantage of polymerizable composition used usually to traditional ophthalmic industry is linked to the shrinkage phenomenon. At a general knowledge shrinkage could be defined as a reduction in the size of a part after it has changed from a liquid state to a solid state. So for polymer composition obtained by polymerization of polymerizable composition, during the curing cycle, the thermoset undergoes the residual deformation and stresses due to shrinkage of matrix. This shrinkage may have a thermal and/or chemical origin. The chemical shrinkage is a direct consequence of crosslinking of the thermosetting polymer.

When polymerizable composition shrink, materials of the objects can change their fundamental properties. The shrinkage can cause change in geometry and shrinking of a part of the object will also induce internal stress buildup. Objects having an internal stress buildup tend toward a more relaxed state by changing their geometry. This is especially problematic when manufacturing products, such as ophthalmic lenses. In particular, it is critical that ophthalmic lenses be transparent and that their geometric configuration be maintained throughout manufacturing. Typically the geometric configuration of an ophthalmic lens comprises a first surface and a second surface that can have complex curvatures. Any shrinkage or distortion of these curvatures could affect the optical property of the lens.

In traditional manufacturing processes, such as mold casting, it's known that all resins shrink during polymerization, and this is usually compensated for by the mold design. In traditional subtractive manufacturing processes that involve a post-processing step, the subtractive manufacturing steps compensate for any shrinkage. However, to avoid the time-consuming step of post-processing used in subtractive manufacturing, it's preferable for the geometry of the object not to change from deposition to final cure. In one known solution, a software program such as CAD, has been used to predict or model the amount of shrinkage that a product would undergo that is produced by additive manufacturing. This solution is complex because it must be adapted to each article shape and material. Thus, there exists a need to reduce or control shrinkage of an ophthalmic lens during additive manufacturing while maintaining the geometric stability of the ophthalmic lens. The physical constitution of voxels in additive manufacturing technologies classically uses physical means to induce geometry variations in the voxels during the fabrication process. The physical means may include introducing light and/or thermal variations. Unfortunately, said means typically generate dimensional shrinkage at the scale of individual voxels, and also macroscopic stress building at the scale of the object produced by the additive manufacturing process.

These dimensional changes at the individual voxel scale or from the collective effect during voxel assembly, including stress build up, which can directly impact the optical characteristics of the final object as well the ability of the final object to modify an optical wavefront propagation in a controlled and deterministic fashion. For ophthalmic lenses, such dimensional changes alter the final prescription associated with said ophthalmic lenses, causing a severe detriment when the prescription is supposed to be individualized to a particular wearer.

So it is an object of the invention to provide a polymer composition to manufacture an ophthalmic lens by polymerization of polymerizable composition wherein the shrinkage phenomenon is minimized. The polymerizable composition comprised 2 different categories of monomers which are able during crosslinking to control and limit said chemical shrinkage.

SUMMARY OF THE INVENTION

The present invention proposes a polymer composition to manufacture a transparent ophthalmic lens characterized in that it is obtained by polymerization of a polymerizable composition comprising at least:
- a monomer or oligomer (A) comprising at least a reactive group selected from epoxy, thioepoxy, epoxysilane, (meth)acrylate, thio(meth)acrylate, vinyl, urethane, thiourethane, isocyanate, mercapto, and alcohol, wherein said monomer (A) shrinks during polymerization;
- a monomer (B) comprising at least a non-aromatic cyclic group wherein during polymerization said cyclic group opens and reacts with another molecule of monomer (B) and/or with a reactive group of monomer (A), and wherein said monomer (B) expands during polymerization.

To the polymer composition, monomer or oligomer (A) is present from 99% to 1% by weight of the total weight of polymerizable composition and monomer (B) is present from 1% to 99% by weight of the total weight of polymerizable composition.

Monomer (B) possesses a cyclic group which could be monocyclic, or polycyclic, substituted or unsubstituted, without aromaticity properties, said cyclic group being selected from cyclic sulfates, spiroorthoesters, bicyclic-ortho esters, cyclic carbonates, spiroorthocarbonates, bicyclic ketal lactones, and combinations thereof.

In an embodiment of the invention at least part of reactive group of monomer or oligomer (A) reacts with at least part of reactive group of monomer (B) after the opening step of the cyclic group, to form a copolymer of monomer (A) and (B) during polymerization process.

In another embodiment, reactive group of monomer or oligomer (A) reacts only with reactive group of another molecule of monomer or oligomer (A) to form a homopolymer (A) during polymerization process; and reactive group resulting from the opening of the cyclic part of monomer (B) reacts only with reactive group of another molecule of monomer (B) to form a homopolymer (B) during polymerization process; and no phase separation appears between homopolymer (A) and homopolymere (B) to the resulting polymer composition of the invention.

Advantageously, the ratio of monomer (B) to monomer or oligomer (A) is increased proportionally with the increasing number of reactive groups present in each monomer or oligomer (A).

The polymer composition according to the invention comprises an amount of monomer (B) to reduce the shrinkage of said polymer composition to less than 5%, preferably less than 2% and most preferably around 0%.

The polymer composition of the invention is polymerized in the presence of a polymerization initiator or catalyst. The polymer composition may also comprise various additives. According to the invention the polymerization is carried out photochemically or by heating.

It is also an object of the invention to provide a method of manufacturing an ophthalmic lens characterized in that the polymerizable composition according to the invention and comprising at least a monomer or oligomer (A) and a monomer (B), as mentioned hereinbefore, is cast between two molds having the required surface geometries and polymerization is then carried out, optionally followed by annealing.

In another embodiment, the invention comprises also a method of manufacturing an ophthalmic lens characterized in that the polymer composition according to the invention is manufactured by an additive manufacturing process comprising the following steps:
 /1/ constituting voxels of said polymerizable composition comprising at least a monomer or oligomer (A) and a monomer (B) as mentioned hereinbefore;
 /2/ increasing viscosity of at least a said constituted voxel;
 /3/ optionally inter-diffusing at least a voxel, wherein viscosity is increased, into another voxel, through a physical and/or a chemical treatment;
 /4/ repeating steps /1/, /2/, /3/ in the same order as cited or in a different order according to reactive groups involved in monomer (A) and monomer (B) of said polymerizable composition to form a transparent ophthalmic lens; and
 /5/ optionally applying at least a post-treatment to improve homogenization of the transparent ophthalmic lens.

After deposition of a first voxel (or group of voxels), a first treatment increases the viscosity of the voxels such that they substantially remain where deposited and have sufficient cohesion to support later-deposited voxels. After deposition of a second voxel (or group of voxels), monomer and/or oligomer from the first voxel (or group of voxels) diffuse into the second voxel (or group of voxels) either spontaneously or under application of a second treatment. The second treatment can optionally polymerize or increase the viscosity of the resulting combination of voxels. These steps can be repeated for several sequential depositions. An optional, final treatment, such as photo-polymerization, can occur after each deposition of the voxels.

In accordance with the invention, and depending on the additive manufacturing technology implementation, said three mains actions may be achieved voxel-to-voxel, line-to-line, layer-by-layer, and/or after all desired layers have been formed to produce said three-dimensional transparent ophthalmic lens.

The transparent ophthalmic lens manufactured by a method in accordance of any previous embodiments may further be treated to obtain an ophthalmic lens with at least one added value. Then in accordance with this, the invention comprises a method comprising further step(s):

- adding at least a functional coating and/or a functional film, on at least one face of the ophthalmic lens;
- the functionality of said coating and/or said film being selected from impact-resistance, anti-abrasion, anti-soiling, anti-static, anti-reflective, anti-fog, anti-rain, self-healing, polarization, tint, photochromic, and selective wavelength filter which may be obtained through an absorption filter, a reflective filter, an interferential filter or a combination thereof;
- said functionality may be added by at least one process selected from dip-coating, spin-coating, spray-coating, vacuum deposition, sputtering, transfer process or lamination process.

The transparent ophthalmic lens, manufactured in accordance with an embodiment of the present invention, represents an ophthalmic lens selected from blank lens, semi-finished lens, finished lens, and lens adapted to see-trough "Head-Mounting Display" (HMD). By Head mounting display it is understood a device able to be mounted on the head of a wearer, and comprising an optical imager for shaping light beams coming from an electronic and optical system that generates light beams from an electronic signal, the system being of the miniature screen, laser diode, or light-emitting diode (LED) type; the optical imager directing light beams towards the eye of the wearer so as to enable an information content to be used.

Said transparent ophthalmic lens, may also represent a lens selected from afocal (or no-corrective, or plano), uni-focal, bifocal, trifocal, and progressive lens, said ophthalmic lens being able to be mounted either to traditional frame comprising two distinctive ophthalmic lenses, one for the right eye and one for the left eye, or to mask, visor, helmet sight or goggle, wherein one ophthalmic lens facing simultaneously the right and the left eyes, and said ophthalmic lens may be produced with traditional geometry as a circle or may be produced to be fitted to the geometry to the frame intended. When said ophthalmic lens is dedicated to be mounted to a see-trough "HMD", said lens may be corrective or afocal, and may be placed on the front face and/or on the rear face of the optical imager of the HMD. When the ophthalmic lens is placed on the front face and on the rear face of the optical imager, it means that the optical imager is inserted inside said ophthalmic lens.

Transparent ophthalmic lens obtained from a method of at least one mentioned embodiment is also an object of the present invention.

More details relating to the various embodiments of the invention will be described in the detailed description part of the invention, without any limitation to the general method described hereinbefore.

DETAILED DESCRIPTION OF THE PREFERRED EMBODIMENTS

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

As used herein, "Additive Manufacturing" means manufacturing technology as defined in the international standard ASTM 2792-12, describing a process of joining materials to make 3-D solid objects from a 3-D digital model. The process is referred to as "3-D printing" or "materials printing" since successive layers are laid down atop one another.

Printing materials include liquids, powders, and sheet materials, from which series of cross-sectional layers are built. The layers, which correspond to the virtual cross sections from the CAD model, are joined or automatically fused to create the solid 3-D object. Additive Manufacturing includes, but is not limited to, manufacturing methods such as stereolithography, mask stereolithography, mask projection stereolithography, polymer jetting, scanning laser sintering (SLS), scanning laser melting (SLM), and fused deposition modelling (FDM). Additive Manufacturing technologies comprise processes which create 3-D solid objects by juxtaposition of volume elements or particles according to a pre-determined arrangement, typically defined in a CAD (Computer Aided Design) file. Juxtaposition is understood as sequential operations including building one material layer on top of a previously built material layer, and/or positioning a material volume element next to a previously deposited material volume element.

One such additive manufacturing method employs a printer head such as in an ink-jet or polymer-jet printer that deposits discrete units (voxels) of a composition onto a substrate or previously deposited voxel. The voxels are typically deposited as layers, with successive layers inter-diffused and converted to a geometrically stable voxel composition. In jet printing a critical step is maintaining voxel shape. The voxel shape is then converted to a homogenous solid by UV or thermal curing, for example. These printing processes are particularly compatible with the polymer composition of the present invention.

Another method involves a pool or bath of polymerizable composition as a curable liquid. A selected cross-section of a layer of the polymerizable composition is cured, such as by exposure to UV radiation. An additional layer of the curable liquid is then constituted or deposited onto the first layer, and the process is gradually repeated, building-up the desired three-dimensional solid element. This technology is well known as stereolithography and its derivatives.

As used herein, "voxel" means a volume element. A voxel is a distinguishable, geometric shape which is part of a three-dimensional space. As used herein, "voxel" can refer to an individual element which, in combination with other voxels, defines an intermediate element which could be a layer of within the shape. Additionally, the term "voxel," as used herein, can apply to an intermediate element which is part of the three-dimensional space. That is, a single voxel can comprise a layer of the three-dimensional space, more particularly when the additive manufacturing technology used is based on stereolithography technologies. A particular voxel may be identified by x, y, and z coordinates of a selected point of geometry of the shape, such as a corner, centre, etc., or by other means known in the art.

Within the terms of reference of the invention, an ophthalmic lens is understood to be transparent when the observation of an image through said ophthalmic lens is perceived with no significant loss of contrast, that is, when the formation of an image through said ophthalmic lens is obtained without adversely affecting the quality of the image. This definition of the term "transparent" can be applied, within the terms of reference of the invention, to all objects qualified as such in the description.

In the present invention, the wording "constitutes a voxel" and its derivatives could be understood like:
deposit a droplet of polymerizable composition to a substrate, through an inkjet head of an ink-jet printer; in this case the additive manufacturing technology used is polymer jetting and the droplet represents a voxel.

apply a polymerizable composition as a thin layer to a surface of a bath and performe selective polymerization of said composition; in this case the additive manufacturing technology used is stereolithography [stereolithography, mask stereolithography or mask projection stereolithography] and the layer represents a voxel.

As used herein, polymerization/polymerizing/polymerizable refers to a chemical reaction that produces bonding of two or more monomers and/or oligomers to form a polymer. Polymerization and all grammatical variations include photo-polymerizable and/or thermo-polymerizable compositions. Photo-polymerizable means polymerization which occurs by exposing a composition to activating light. Thermo-polymerizable means polymerization which occurs by exposing the composition to a variation of temperature.

As used herein, curing refers to a chemical process of converting a monomer or a oligomer into a polymer of higher molar mass and then into a network.

As used herein, "monomer" and/or "oligomer" refer to a chemical compound comprising at least a reactive group able to react to activating light, and/or temperature in the presence of an initiator. More details relating to "reactive group" being involved will be described latter in the present specifications.

As used herein "activating light" refers to actinic radiation and visible light. Activating light may affect a chemical change. Activating light may include ultraviolet light (e.g., light having a wavelength between about 280 nm to about 400 nm), actinic light, visible light or infrared light. Generally, any wavelength of light capable of affecting a chemical change may be classified as activating. Chemical changes may be manifested in a number of forms. A chemical change may include, but is not limited to, any chemical reaction that causes a polymerization to take place.

As used herein, an initiator represents a photo-initiator or a thermo-initiator.

A photo-initiator represents a molecule employed alone or in a chemical system (involving two or more molecules) that absorbs light and forms reactive initiating species. Then by absorption of light, a photo-initiator generates reactive species (ion or radical) and initiates a chemical reaction or transformation.

As used herein, a co-initiator represents a molecule as part of a chemical system which does not absorb light but, nevertheless, participates in the production of the reactive species.

The polymer composition according to the invention can also contain additives used conventionally in compositions intended for manufacturing ophthalmic elements, in standard proportions, namely, inhibitors, dyes, UV absorbers, fragrances, deodorants, surface active agents, surfactants, binders, antioxidants, optical-brigthner and anti-yellowing agents.

As used herein, "inter-diffuse," and derivatives, means movement of at least an ion, molecule, portion of a molecule, or portion of a polymer chain, from the space occupied by one voxel into the space occupied by a juxtaposed, physically contacting, voxel. Inter-diffusion can occur spontaneously or be induced by mechanical, physical, or chemical treatment. For example, a mechanical treatment includes agitation, such as by exposure to ultra-sonic energy, high-frequency vibratory device, etc., which promote mixing at the voxel boundaries. Macro-diffusion is a mechanical method wherein the voxels are blended or "smeared" by table vibrations, especially where such vibrations occur at the time of deposition, resulting in intimate voxel-to-voxel contact. An exemplary physical treatment includes a thermal treatment by exposure to heat, infra-red, microwave, etc., radiation. A thermal treatment increases temperature above the glass-liquid transition point (Tg) of the high viscosity domain in the voxels and promotes inter-diffusion. An exemplary chemical treatment includes a chemical reaction between reactive species of composition. The molecular mass of the polymers present in the voxels can be reduced, such as by two-pathway chemistries or reversible reactions, to promote inter-diffusion.

The polymer composition according to the invention comprises at least a monomer (B), said monomer (B) expands during polymerization. Generally, an expanding monomer is one that exhibits expansion in volume during ring opening polymerization. Thus, the monomeric volume of the composition may be maintained during polymerization or may be only minimally changed during polymerization or may be only negligibly changed during polymerization. In addition, the volume after polymerization of a composition comprising an expanding monomer is either maintained (e.g., with near zero shrinkage) or only minimally reduced or only negligibly reduced. The shrinkage of a composition containing an expanding monomer may be less than about 5% or less than about 4% or less than about 3% or less than about 2% or most preferably around 0%. The monomers (B) disclosed herein are capable of expanding their volume after polymerization.

Monomers (B) comprised at least a non-aromatic cyclic group such as cyclic carbonates or bicyclic monomers with fused rings (having at least one carbon atom in common) that maintain or expand their volume during polymerization due to an opening of strained rings. Bicyclic expanding monomers exhibit a double ring opening during polymerization, such that for every shift from a van der Waals bond to a covalent bond, which occurs during polymerization, there are two covalent bonds that are broken. This is in contrast with conventional monomers (or oligomers) that shrink during polymerization, which leads to a negative change in volume, which is sometimes quite significant. Conventional monomers or oligomers also undergo a one-to-one replacement of one van der Waals attraction with one covalent bond during polymerization.

Catalysis (polymerization) of an expanding monomer is generally initiated by a Lewis acid (e.g., cationic-induced ring opening or anionic-induced ring opening) or a free-radical initiating agent. Catalysis often occurs in the absence of a solvent. A solvent may be included depending on the selection of any additional monomer(s) or oligomer(s) present in the initial polymerizable composition. Optionally, a reaction promoter, capable of accelerating polymerization, may be added (e.g., polyol) to the initial polymerizable composition. Polymerization of expanding monomers (B) may also be initiated in the presence of light, such as visible light or ultraviolet (UV) light; hence, said expanding monomers are often photopolymerizable. In addition, many expanding monomers (B) are temperature sensitive, such that the temperature during polymerization directly affects the degree of expansion.

In accordance with the invention monomer (B) comprises a non-aromatic cyclic group, which may be monocyclic or polycyclic, substituted or unsubstituted. By monocyclic group it is understood a cycle carbon chain comprising from 5 to 12 atoms to said chain, wherein 1 to 4 carbon atom could be replaced by a group selected from O, N, CO, S, SO, or $SO_2$ and wherein 1 to 3 single carbon-carbon bond of the cycle chain could be replaced by carbon-carbon double bonds. By polycyclic group it is understood a group comprising 1, 2 or 3 cycles, each cycle being from 3 to 8 members, each cycle being fused together or bond together by at least one common atom, wherein 1 to 6 carbon atom of the polycyclic chain may be replaced by a group selected from O, N, CO, S, SO, or $SO_2$ and wherein 1 to 4 single carbon-carbon bond of the polycyclic chain may be replaced by carbon-carbon double bonds. Such monocyclic group is represented for example by the following structure: cyclopentyl, cyclohexyl, cycloheptyl, azirine, oxyrane, thiiranes, oxetane, oxelane, imidazoline, imidazolidine, morpholine, piperazine, piperidine, pyrazolidine, pyrrolidine, and the like. Such polycyclic group may be for example derivative of quinuclidine, oxaspiro[4,5]decane, 3,9-dioxaspiro[5,5]undecane, dispiro[4.2.4.2]tetradecane, spiro[4.4]nona-2,7-diene, . . . . Preferentially, in accordance with the invention, Monomer (B) represents a fused bicyclic rings, and more particularly wherein said ring of the bicyclic have at least one common atom (spiro structure), each ring contains at least one atom of another element than carbon, and the ring do not open in a symmetrical manner. For example, an oxygen atom in one ring may from a carbonyl group while the corresponding oxygen in the other ring would form an ether group.

Monocyclic or polycyclic group of monomer (B) may be unsubstituted or comprised from 1 to 6 substituents, identical or different, independently of each other, selected from $C_1$-$C_6$ alkyl, $C_1$-$C_6$ alkenyl, $C_1$-$C_6$ alkoxy, halo, hydroxy, selected from halogen, —$R_a$, —OH, —$OR_a$, —SH, —$SR_a$, —$NH_2$, —$NR_aR_{a1}$, —CO—$R_a$, —$CO_2R_{a1}$, wherein $R_a$ and $R_{a1}$ identical or different represent a group selected from $C_1$-$C_{10}$ alkyl wherein a carbon-carbon bond may be replaced by at least one carbon-carbon double bond, and/or from 1 to 3 carbon atom may be replaced by an oxygen atom, a sulphur atom or a carbonyl group.

Suitable monomer (B), as described herein, will include preferentially, but are not limited to, cyclic sulfates, spiroorthoesters, bicyclic-ortho esters, cyclic carbonates, spiroorthocarbonates, norbornene spiroorthocarbonates, bimethylene spiroorthocarbonates and bicyclic ketal lactones.

A cyclic sulfate will have the general structure, as provided below, before ring opening (25) and after ring opening (26, 27).

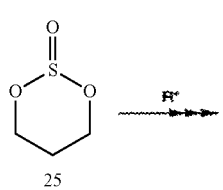

25

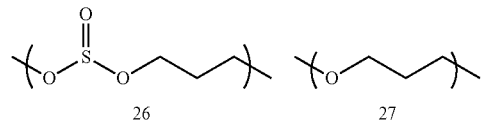

26　　　　　　27

A cyclic carbonate will have the general structure, as provided below, before (20) ring opening and after (21, 22) ring opening.

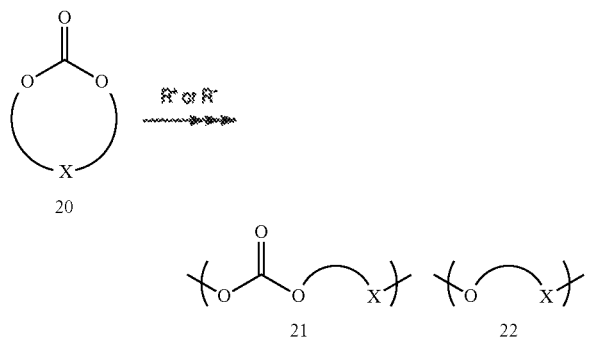

A bicyclic-ortho ester will have the general structure, as provided below, before (left) a double ring opening and after (right) a double ring opening.

A spyro-ortho ester will have the general structure, as provided below, before (left) a double ring opening and after (right) a double ring opening.

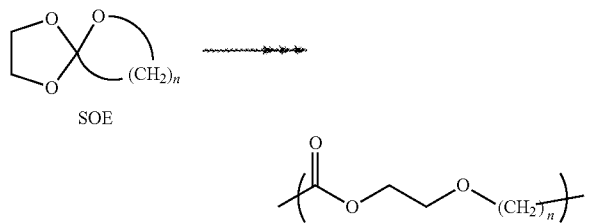

Polymerization with expansion in volume can be achieved with spiroorthocarbonate monomers through a double ring-opening process wherein two bonds are cleaved for each new bond formed.

Monomer or oligomer (A) of the polymerizable composition to provide the polymer composition in accordance with the invention, comprises at least a reactive group selected from epoxy, thioepoxy, epoxysilane, (meth)acrylate, thio(met)acrylate, vinyl, urethane, thiourethane, isocyanate, mercapto and alcohol. We will now describe in more details list of monomer and/or oligomer that may be used as monomer/oligomer (A) in the present invention.

Monomers/oligomer (A) comprising at least an epoxy/thioepoxy reactive group are classified as either aromatic (such as bisphenol A and F epoxies) or aliphatic. Aliphatic epoxies are lower in viscosity. Aliphatic epoxies can be both completely saturated hydrocarbons (alkanes) or can contain double or triple bonds (alkenes or alkynes). They can also contain rings that are not aromatic. Epoxy may be also monofunctional or polyfunctional, and such epoxy may be from the family of alkoxysilane epoxy.

Non-alkoxysilane polyfunctional epoxy monomers may be selected from the group consisting of diglycerol tetraglycidyl ether, dipentaerythritol tetraglycidyl ether, sorbitol polyglycidyl ether, polyglycerol polyglycidyl ether, pentaerythritol polyglycidyl ether such as pentaerythritol tetraglycidyl ethertrimethylolethane triglycidyl ether, trimethylolmethane triglycidyl ether, trimethylolpropane triglycidyl ether, triphenylolmethane triglycidyl ether, trisphenol triglycidyl ether, tetraphenylol ethane triglycidyl ether, tetraglycidyl ether of tetraphenylol ethane, p-aminophenol triglycidyl ether, 1,2,6-hexanetriol triglycidyl ether, glycerol triglycidyl ether, diglycerol triglycidyl ether, glycerol ethoxylate triglycidyl ether, Castor oil triglycidyl ether, propoxylated glycerine triglycidyl ether, ethylene glycol diglycidyl ether, 1,4-butanediol diglycidyl ether, neopentyl glycol diglycidyl ether, cyclohexanedimethanol diglycidyl ether, dipropylene glycol diglycidyl ether, polypropylene glycol diglycidyl ether, dibromoneopentyl glycol diglycidyl ether, hydrogenated bisphenol A diglycidyl ether, (3,4-Epoxycyclohexane) methyl 3,4-epoxycylohexylcarboxylate and mixtures thereof.

The monoepoxysilanes are commercially available and include, for example, beta-(3,4-epoxycyclohexyl)-ethyltrimethoxysilane, (gamma-glycidoxypropyltrimethoxysilane), (3-glycidoxypropyl)-methyl-diethoxysilane, and gamma-glycidoxy-propylmethyldimethoxysilane. These commercially available monoepoxysilanes are listed solely as examples, and are not meant to limit the broad scope of this invention. Specific examples of the alkyltrialkoxysilane or tetraalkoxysilane suitable for the present invention include methyltrimethoxysilane, ethyltrimethoxysilane, phenyltrimethoxysilane.

Monomers/oligomers (A) of the invention may comprise (meth)acrylate or thio(meth)acrylate reactive group. As used in the present invention the term acrylate and acrylic referred to the same chemical functionality. The word "meth" in two brackets as "(meth)" associated to the term acrylate, specifies that relating to a molecule or to a family of molecules the acrylate function $H_2C=CHC(O)-$ could have a methyl group at □ position of the ethylene function like $H_2C=C(CH_3)C(O)-$.

(Meth)acrylates can be monofunctional, difunctional, trifunctional, tetrafunctional, pentafunctional, and even hexafunctional. Typically, the higher the functionality, the greater is the crosslink density. (Meth)acrylates have slower curing than the acrylates.

The two, three, four or six (meth)acrylic functional groups is selected from the group consisting of pentaerythritol triacrylate, pentaerythritol tetraacrylate, tetraethyleneglycol diacrylate, diethyleneglycol diacrylate, triethyleneglycol diacrylate, 1,6-hexanediol di(meth)acrylate, tripropylene glycol diacrylate, dipropyleneglycol diacrylate, ethyleneglycol dimethacrylate, trimethylolethane triacrylate, trimethylolmethane triacrylate, trimethylolpropane triacrylate, trimethylolpropane trimethacrylate, 1,2,4-butanetriol trimethacrylate, tris(2-hydroxyethyl) isocyanurate triacrylate, di-trimetholpropane tetraacrylate, ethoxylated pentaerythritol tetraacrylate, triphenylolmethane triacrylate, trisphenol triacrylate, tetraphenylol ethane triacrylate, 1,2,6-hexanetriol triacrylate, glycerol triacrylate, diglycerol triacrylate, glycerol ethoxylate triacrylate, ethylene glycol diacrylate, 1,4-butanediol diacrylate, 1,4 butanediol dimethacrylate, neopentyl glycol diacrylate, cyclohexanedimethanol diacrylate, dipropylene glycol diacrylate, polypropylene glycol diacrylate dipentaerythritol hexaacrylate, polyester hexaacrylate, sorbitol hexaacrylate, and fatty acid-modified polyester hexaacrylate, and is most preferably dipentaerythritol hexaacrylate.

Among monomer and/or oligomer comprising this reactive group, we can mention the monomer corresponding to the above formula.

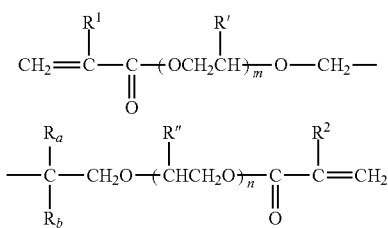

In which R1, R2, R' and R" represent, independently of one another, a hydrogen atom or a methyl radical, Ra and Rb, which are identical or different, each represent an alkyl group having 1 to 10 carbon atoms, and m and n are integers wherein m+n is comprised between 2 to 20 inclusive.

Among the monomers particularly recommended in the compositions according to the invention, of 2,2-di(C2-C10) alkyl-1,3-propanediol 2x-propoxylate di(meth)acrylate and 2,2-di(C2-C10)alkyl-1,3-propanediol 2x-ethoxylate di(meth)acrylate, like for example 2-ethyl-2-n-butyl-1,3-propanediol 2x-propoxylate dimethacrylate. (Meth)acrylic monomers as mentioned above and their process of preparation are disclosed in the document WO-95/11219. This kind of monomer is able to be polymerized by photopolymerization techniques or mixed photopolymerization and thermal polymerization techniques.

Advantageously the composition comprising this (meth) acrylic monomer can comprise other monomer(s) polymerizable by a radical route, and presenting one or more (meth)acrylate functional groups and/or one or more allyl groups. Mention may be made, among these monomers, of poly(methylene glycol) mono- and di(meth)acrylates, poly (ethylene glycol) mono- and di(meth)acrylates, poly(propylene glycol) mono- and di(meth)acrylates, alkoxypoly(methylene glycol) mono- and di(meth)acrylates [sic], alkoxypoly (ethylene glycol) mono- and di(meth)acrylates [sic] and poly(ethylene glycol)-poly(propylene glycol) mono- and di(meth)acrylates. These monomers are disclosed, inter alia, in the document U.S. Pat. No. 5,583,191.

Mention may be made, among monomers comprising a (meth)acrylate functional group and an allyl group, of tri (propylene glycol) di(meth)acrylate, poly(ethylene glycol) dimethacrylate [sic] (for example, poly(ethylene glycol-600) dimethacrylate, poly(propylene glycol) dimethacrylate [sic] (for example, poly(propylene glycol-400) dimethacrylate), bisphenol A alkoxylate dimethacrylate [sic], in particular bisphenol A ethoxylate and propoxylate dimethacrylate [sic] (for example, bisphenol A 5-ethoxylate dimethacrylate, bisphenol A 4,8-ethoxylate dimethacrylate and bisphenol A 30-ethoxylate dimethacrylate). Mention may also be made, among the monofunctional monomers, of aromatic mono(meth)acrylate oligomers, and, among the trifunctional monomers, of tri(2-hydroxyethyl)iso-cyanurate triacrylate, trimethylolpropane ethoxylate acrylate and trimethylolpropane propoxylate acrylate.

The polymerizable composition according to the invention and comprising such (meth)acrylate monomer and/or oligomer, also comprises a system for initiating the polymerization. The polymerization initiating system can comprise one or more thermal or photochemical polymerization initiating agents or alternatively, preferably, a mixture of thermal and photochemical polymerization initiating agents.

Generally, the initiating agents are used in a proportion of 0.01 to 5% by weight with respect to the total weight of monomers present in the composition. As indicated above, the composition more preferably simultaneously comprises a thermal polymerization initiating agent and a photoinitiator.

Among monomer/oligomer (A) comprising thio(meth) acrylate as reactive group, the present invention can notably use functional monomers of mono(thio)(meth)acrylate or mono- and di(meth)acrylate type bearing a 5- to 8-membered heterocycle consisting of hydrogen, carbon and sulphur atoms and having at least two endocyclic sulphur atoms. Preferably, the heterocycle is 6- or 7-membered, better still 6-membered. Also preferably, the number of endocyclic sulphur atoms is 2 or 3. The heterocycle can optionally be fused with a substituted or unsubstituted C5-C8 aromatic or polycyclanic ring, preferably a C6-C7 ring. When the heterocycle of the functional monomers contains 2 endocyclic sulphur atoms, these endocyclic sulphur atoms are preferably in positions 1-3 or 1-4 of the heterocycle. According to the invention, the monomer is preferably also a thio(meth)acrylate monomer. Lastly, the monomers according to the invention preferably have molar masses of between 150 and 400, preferably 150 and 350 and better still between 200 and 300. Example of such monomers is described in the document U.S. Pat. No. 6,307,062 which is incorporated by reference.

Advantageously the polymerizable composition comprising such thio(meth)acrylate monomers may comprise a co-monomer.

Among the co-monomers which can be used with the monomers (A) of (thio)(meth)acrylate type for polymerizable compositions according to the invention, mention may be made of mono- or polyfunctional vinyl, acrylic and methacrylic monomers.

Among the vinyl co-monomers which are useful in the compositions of the present invention, mention may be made of vinyl alcohols and vinyl esters such as vinyl acetate and vinyl butyrate. The acrylic and methacrylic co-monomers can be mono- or polyfunctional alkyl (meth)acrylate co-monomers and polycyclenic or aromatic mono(meth) acrylate co-monomers. Among the alkyl (meth)acrylates, mention may be made of styrene, .alpha.-alkylstyrenes such as .alpha.-methyl styrene, methyl (meth)acrylate, ethyl (meth)acrylate, butyl (meth)acrylate, isobutyl (meth)acrylate or difunctional derivatives such as butanediol dimethacrylate, or trifunctional derivatives such as trimethylolpropane trimethacrylate.

Among the polycyclenic mono(meth)acrylate co-monomers, mention may be made of cyclohexyl (meth)acrylate, methylcyclohexyl (meth)acrylate, isobornyl (meth)acrylate and adamantyl (meth)acrylate.

Co-monomers which may also be mentioned are aromatic mono(meth)acrylates such as phenyl (meth)acrylate, benzyl (meth)acrylate, 1-naphthyl (meth)acrylate, fluorophenyl (meth)acrylate, chlorophenyl (meth)acrylate, bromophenyl (meth)acrylate, tribromophenyl (meth)acrylate, methoxyphenyl (meth)acrylate, cyanophenyl (meth)acrylate, biphenyl (meth)acrylate, bromobenzyl (meth)acrylate, tribromobenzyl (meth) acrylate, bromobenzylethoxy(meth) acrylate, tribromobenzylethoxy(meth)acrylate and phenoxyethyl (meth)acrylate.

The crosslinking process which is particularly suitable for polymerizable composition based on thio(meth)acrylate alone or in combination with at least one co-monomer, as defined hereinbefore, are photochemical polymerization or a combination of a photochemical polymerization and a thermal condensation reaction. A recommended polymerization process is photochemical polymerization via ultraviolet radiation and preferably UV-A radiation. Thus, the composition also contains photo-initiators and/or condensation catalysts. Preferably photo-initiators and/or thermal catalyst, are present in proportions of from 0.001 to 5% by weight relative to the total weight of the composition, and even more preferably from 0.01 to 3.5%. The photo-initiators which can be used in composition according to the invention are, in particular, 2,4,6-trimethylbenzoyldiphenylphosphine oxide, 1-hydroxycyclohexyl phenyl ketone, 2,2-dimethoxy-1,2-diphenyl-1-ethanone and alkylbenzoin ethers.

Vinyl ether group presents as reactive group to monomer or oligomer (A) is also suitable. Example of such compound comprising this functionality are ethyl vinyl ether, propyl vinyl ether, isobutyl vinyl ether, cyclohexyl vinyl ether, 2-ethyl hexyl vinyl ether, butyl vinyl ether, ethylenglycol monovinyl ether, diethyleneglycol divinyl ether, butane diol divinyl ether, hexane diol divinyl ether, cyclohexane dimethanol monovinyl ether Among the preferred polyisocyanate or isothiocyanate monomers or oligomers (A) suitable in accordance with the present invention, there may be cited tolylene diisocyanate or diisothiocyanate, phenylene, diisocyanate or diisothiocyanate, ethylphenylene diisocyanate or diisothiocyanate, isopropyl phenylene diisocyanate or diisothiocyanate, dimethylphenylene diisocyanate or diisothiocyanate, diethylphenylene diisocyanate or diisothiocyanate, diisopropylphenylene diisocyanate or diisothiocyanate, trimethylbenzyl triisocyanate or triisothiocyanate, xylylene diisocyanate or diisothiocyanate, benzyl triiso(thio)cyanate, 4,4'-diphenyl methane diisocyanate or diisothiocyanate, naphthalene diisocyanate or diisothiocyanate, isophorone diisocyanate or diisothiocyanate, bis(isocyanate or diisothiocyanate methyl) cylcohexane, hexamethylene diisocyanate or diisothiocyanate, and dicyclohexylmethane diisocyanate or diisothiocyanate.

Among monomer or oligomer (A) comprising a mercapto reactive group, the preferred polythiol monomers and/or oligomers suitable in accordance with the present invention, there may be cited aliphatic polythiols such as pentaerythritol tetrakis mercaptopropionate, 1-(1'-mercaptoethylthio)-2,3-dimercaptopropane, 1-(2'-mercapropylthio)-2,3-dimercaptopropane, 1-(3'-mercapropylthio)-2,3-dimercaptopropane, 1-(4'-mercabutylthio)-2,3-dimercaptopropane, 1-(5'-mercapentylthio)-2,3-dimercaptopropane, 1-(6'-mercahexylthio)-2,3-dimercaptopropane, 1, 2-bis-(4'-mercaptobutylthio)-3-mercaptopropane, 1,2-bis-(5'-mercaptopentylthio)-3-mercaptopropane, 1,2-bis-(6'-mercaptohexylthio)-3-mercaptopropane, 1,2,3-tris(mercaptomethylthio)propane, 1,2,3-tris-(3'-mercaptopropylthio)propane, 1,2,3-tris-(2'-mercaptoethylthio)propane, 1,2,3-tris-(4'-mercaptobutylthio)propane, 1,2,3-tris-(6'-mercaptohexylthio)propane, methanedithiol, 1,2-ethandithiol, 1,1-propanedithiol, 1,2-propanedithiol, 1,3-propanedithiol, 2,2-propanedithiol, 1,6-hexanethiol-1,2,3-propanetrithiol, and 1,2-bis(2'-mercpato-ethylthio)-3-mercaptopropane.

Photo-initiator may be used alone or in a mixture of two or more compounds, or as a combination or two or more compounds like co-initiators. The choice of photo-initiator is based firstly to the nature of reactive group(s) of monomer or oligomers (A) and monomer (B) used in the polymerizable composition and also to the kinetic of polymerization. Then it is well-known that cationic curable compositions cure slower than free radically curable compositions. In term of methods used in accordance with the various embodiments of the invention, the man skilled in the art will adapt easily the choice of such photoinitiator.

Example of Free radical initiator suitable for the present invention, are listed below, without any limitation: benzophenone, methyl benzophenone, xanthones, acylphosphine oxide type such as 2,4,6-trimethylbenzoyldiphenyl phosphine oxide, 2,4,6-trimethylbenzoylethoxydiphenyl phosphine oxide, bisacylphosphine oxides (BAPO), benzoin and benzoin alkyl ethers like benzoin methyl ether, benzoin isopropyl ether.

Free radical photo-initiators can be selected also for example from haloalkylated aromatic ketones such as chloromethylbenzophenones; some benzoin ethers such as benzoin methyl ether, benzoin ethyl ether, benzoin isopropyl ether, benzoin isobutylether ether, benzoin, benzyl, benzyl disulfide; dialkoxyacetophenones such as diethoxyacetophenone and α,α-dimethoxy-α-phenylacetophenone, benzylideneacetophenone, benzophenone, acetophenone; hydroxy ketones such as (1-[4-(2-hydroxyethoxy)-phenyl]-2-hydroxy-2-methyl-1-propan-1-one) (Irgacure® 2959 from CIBA), 2,2-di-sec-butoxyacethophenone, 2,2-diethoxy-2-phenyl-acetophenone, 1-hydroxy-cyclohexyl-phenyl-ketone (Irgacure® 184 from CIBA) and 2-hydroxy-2-methyl-1-phenylpropan-1-one (such as Darocur® 1173 sold by CIBA); alpha amino ketones, particularly those containing a benzoyl moiety, otherwise called alpha-amino acetophenones, for example 2-methyl 1-[4-phenyl]-2-morpholino-propan-1-one (Irgacure® 907 from CIBA), (2-benzyl-2-dimethyl amino-1-(4-morpholinophenyl)-butan-1-one (Irgacure® 369 from CIBA); monoacyl and bisacyl phosphine oxides and sulphides, such as phenylbis(2,4,6-trimethylbenzoyl)-phosphine oxide (Irgacure® 819 sold by CIBA); triacyl phosphine oxides; and mixtures thereof.

Mention may be made, among the photoinitiators, of in particular 2,4,6-trimethylbenzoyldiphenyl-phosphine oxide, 1-hydroxycyclohexyl phenyl ketone, 2,2-dimethoxy-1,2-diphenylethane-1-one [sic] and alkyl benzoyl ethers.

Cationic photo-initiator comprises notably compounds which are able to form aprotic acids or Bronsteäd acids upon exposure to activating light like UV or visible light. Examples of suitable cationic photo-initiator, without any limitations are listed below: aryldiazonium salts, diarylliodonium salts, triarylsulfonium salts, triarylselenium salts.

Mention may be made, among the thermal polymerization initiating agents which can be used in the present invention, of organic peroxides, inorganic peroxides, or azo initiators. Organic peroxides can include, but are not limited to, peroxycarbonates, peroxyesters, dialkylperoxides, diacylperoxide, diperoxyketals, ketoneperoxides, hydroperoxides, benzoyl peroxide, cyclohexyl peroxydicarbonate and isopropyl peroxydicarbonate Inorganic peroxide thermal initiators can include, but are not limited to, ammoniumpersulfate, potassiumpersulfate, and sodiumpersulfate.

As used herein, a co-initiator represents a molecule as part of a chemical system which does not absorb light but, nevertheless, participates in the production of the reactive species. Co-initiator is particularly suitable in combination with some free-radical initiator, like benzophenone which requires a second molecule, such as an amine, to produce a curable radical. Then, under UV radiation, benzophenone reacts with a tertiary amine by hydrogen abstraction, to generate an alpha-amino radical which is well known to initiate polymerization of (meth)acrylate monomer(s) and/or oligomer(s)

Examples of co-initiators are listed below comprise reactive amine co-initiators commercially available from Sartomer company under the trade names of CN-381, CN6383, CN-384, and CN-386, where these co-initiators are monoacrylic amines, diacrylic amines, or mixture thereof. Other co-initiators include triethylamine, N-methyldiethanloamine, triethanolamine, ethyl-4-simethylaminobenzoate, ethyl-2-dimethylaminobenzoate, n-butoxyethyl-4-dimethylamino benzoate-p-dimethyl amino benzaldehyde, N,N-dimethyl-p-toluidine, and octyl-p-(dimethylamino)benzoate.

In accordance with the invention, advantageous monomers or oligomer (A) are such presented reactive groups selected from epoxy and (meth)acrylate. In a preferred embodiment of the invention it could be judicious to obtain a polymer composition, by polymerization of polymerizable composition comprising at least a monomer (B) which is able to expand after polymerization and at least a monomer or oligomer (A) which is able to present a low shrinkage. To minimize the shrinkage of a monomer some chemical modification could be introduced to the chemical structure of such monomer or oligomer (A) as, for example, an increased chain length, a low number of double bonds, or a reduced number of reactive groups like no more than three. Hence, monomers or oligomers (A) that are highly functionalized such as tetra, penta and hexaacrylates, have increased double bond density, and experience higher volume shrinkage, and thus, are not preferred. In one or more embodiments, monomer or oligomer (A), as described herein, are generally selected for having the lowest possible functionality (number of reactive groups), the highest possible molecular weight (e.g., increased pendant group size); and a low Tg. While many conventional monomers or oligomers typically undergo a volume shrinkage of about greater than about 5%, with an average volume shrinkage of about 10%, or in a range of greater than about 5% to up to about 14%, the monomer (or oligomer) (A) will exhibit a volume shrinkage of about 5% or less. The low shrinkage monomer (or oligomer) (A), by virtue of the characteristics described, are known to exhibit a reduced shrinkage as compared with a conventional monomer that does not have one of the characteristics just described. Examples of such specific monomer (A) include, but are not limited to, a diacrylate monomer (e.g., 1,4'-bis{4-[6-(acryloyl)-1-hexyloxy] benzoyloxy}2-t-butylbenzene; a dimethacrylate monomer (e.g., 1,4'-bis{4-[6-(methacryloyl)-1-hexyloxy]benzoyloxy}2-t-butylbenzene, 4,4'-bis{4-[6-(methacryloyloxy)hexyloxy] benzoyloxy} diphenylether (DPEHDMA); and 2-(t-butyl)-1,4-bis-[4-(6-methacryloxy-hexan-1-oxy)-benzoyloxy]-benzen. In some instances, a monomer (or oligomer) (A) may also be one that has a methacrylate side group rather than an acrylate side group. A methacrylate monomer shrinks less than a corresponding acrylate monomer.

In accordance to the invention, solvents suitable for the polymerizable composition are organic solvents, preferentially polar solvent like methanol, ethanol, propanol, butanol, glycols, and glycol monoethers. This solvent could be used alone or in combination. Used of solvent may be particularly relevant to adjust the viscosity of monomer component (A) and (B), more particularly when said composition will be processed through an additive manufacturing process, and more particularly through a jetting process.

As mentioned hereinbefore an object of the invention is also a method of manufacturing an ophthalmic lens from a polymer composition in accordance with the invention, by a casting process or by an additive manufacturing process.

Such casting process and equipment required are for example well described in the document U.S. Pat. No. 5,662,839. Then such method consists in a method of manufacturing an ophthalmic lens from a polymerizable composition in which a mold is assembled comprising two molding shells and an annular closure member disposed around said molding shells and defining therewith a required molding cavity, said mold is filled with polymerizable composition, and polymerization of said polymerizable composition is as least started, in which method the operations of assembling said mold, filling it and at least starting polymerization of said polymerizable composition are conducted in the same device. In such method the polymerization may be initiated by thermal polymerization or by actinic polymerization depending the nature of monomer or oligomer (A) and monomer (B) comprised to the polymerizable composition and the associated initiators used.

In another embodiment the polymer composition of the present invention is advantageously processed through an additive manufacturing process. Using this method to manufacturing an ophthalmic lens presents the advantage to combine the best optimization of the present invention: shrinkage control, less consumption of polymer composition, and ability to obtain directly a ophthalmic lens directly adapted or closely adapted to the prescription of a wearer and/or shape of frame choice by said wearer. So it is an entire part of the invention a method of manufacturing an ophthalmic lens with a high management level of the polymerization volume shrinkage, and thus geometry control during the construction of the ophthalmic lens, through a control of two technical characteristics of the voxel, that means, the ability to control shrinkage during polymerization, and the ability to maintain good geometry and optics properties. So more particularly, the invention proposes a method of manufacturing an ophthalmic lens wherein the polymerizable composition of the invention, is manufactured by an additive manufacturing process comprising the following steps:

/1/ constituting voxels of said polymerizable composition comprising at least a monomer or oligomer (A) and at least a monomer (B);

/2/ increasing viscosity of at least a said constituted voxel;

/3/ optionally inter-diffusing at least a voxel, wherein viscosity is increased, into another voxel, through a physical and/or a chemical treatment;

/4/ repeating steps /1/, /2/, /3/ in the same order as cited or in a different order according to reactive groups involved in monomer or oligomer (A) and monomer (B) of said polymerizable composition to form a transparent ophthalmic lens; and /5/ optionally applying at least a post-treatment to improve homogenization of the transparent ophthalmic lens.

After constitution of a first voxel (or group of voxels), a first treatment increases the viscosity of the voxels such that they substantially remain where deposited and have sufficient cohesion to support later-deposited voxels. After constitution of a second voxel (or group of voxels), monomer(s) and/or oligomer from the first voxel (or group of voxels) diffuse into the second voxel (or group of voxels) either spontaneously or under application of a second treatment. The second treatment can optionally polymerize or increase the viscosity of the resulting combination of voxels. These steps can be repeated for several sequential depositions. An optional, final treatment, such as photo-polymerization, can occur after each deposition of the voxels. As will be understood by those skilled in the art, the polymerizable compositions may be curable by differing means, such as differing intensity, dosage, rate, and/or frequency of light, and or by the presence of different initiating agents.

In accordance with the invention, and depending on the additive manufacturing technology implementation, said three mains actions (increase viscosity, voxels inter-diffusion, and post treatment which could be optional) may be achieved voxel-to-voxel, line-to-line, layer-by-layer, and/or after all desired layers have been formed to produce the ophthalmic lens.

Constituting voxels, as mentioned to step /1/ of hereinbefore process, will include at least one of the following: 1) depositing a voxel as a droplet of polymerizable composition to a substrate, through an inkjet head of an ink-jet printer; in this case the additive manufacturing technology used is polymer jetting; depositing a voxel as performing selective partial polymerization of a polymerizable composition in a thin layer on a substrate; in this case the additive manufacturing technology used is stereolithography [stereolithography, mask stereolithography or mask projection stereolithography].

After constitution of the first voxels, it is desirable to increase the viscosity of monomer(s)/oligomer(s) blend such that the voxels remain where deposited and have sufficient cohesion that they can support additionally dispensed voxels. The step consisting to increase the voxel viscosity comprises a double objective: firstly to maintain the integrity and the geometry of each voxel created during the method, secondly to guarantee that each voxel represents a three dimensional object. This characteristic is mandatory to be able to control the geometry of the final 3D ophthalmic lens. The increase in voxel viscosity can be achieved by processes such as:
  a crosslinking process, which could be initiate by cationic reaction, by free radical reaction or by condensation reaction by applying activating light or thermal treatment to polymerizable composition;
  an evaporation process, and more particularly evaporation of solvent comprised into said polymerizable composition; and
  a process consisting to submit said polymerizable composition to a temperature which is below the temperature used at the deposition step of the voxel.

It is an embodiment of the invention, wherein each step of increasing viscosity in a method may be identical or different. As used herein, "viscosity" refers to a fluid's resistance to deformation. Polymerizable composition, suitable for use in an additive manufacturing device, in accordance with the invention, typically presents a viscosity comprised from 40 to 100 cPs at 25° C. In accordance with the method of the present invention the step of increasing viscosity is able to increase the initial viscosity of the polymerizable composition from 5 times to 20 times, the final viscosity of the ophthalmic lens manufactured by said method being more than 50 000 cPs at 25° C.

Inter-diffusing step(s) can be promoted by processes selected from:
  a spontaneous inter-diffusion; and
  an induced inter-diffusion, which represent a process selected from the group consisting of exposure to radiation, mechanical agitation, decrease and exposure to a solvent.

Exposure to radiation may be realized for example, through heating, heated convection, infra-red heating, microwave.

It is anticipated that successful spontaneous inter-diffusion requires the voxel composition be below a specific viscosity at ambient or laboratory conditions to result in "fast-enough" diffusion between juxtaposed voxels for desirable mechanical and optical properties to be achieved. There is the same requirement for inter-diffusion between voxel and intermediate element or between intermediate element(s).

In accordance with this herein before embodiment it is understood that each step of inter-diffusing is identical or different.

Post-treatment step(s) may be selected from:
  a crosslinking process, which could be initiated by cationic reaction, by free radical reaction or by condensation reaction by applying activating light or thermal treatment to polymerizable composition;
  an annealing process; and
  a drying process by thermal treatment or solvent extraction.

In accordance with this herein before embodiment it is understood that each step of post-treatment is identical or different.

In a specific embodiment of the invention it is possible to use different polymerizable composition for constituting the different voxels. By different polymerizable composition it is understood, that each polymerizable composition comprises at least a monomer/oligomer (A) and a monomer (B), but said monomer/oligomer (A) may be different in each polymerizable composition like a monomer/oligomer (A1) and (A2), and/or monomer (B) may be different in each polymerizable composition like a monomer (B1) and a monomer (B2). Such polymer composition obtained by a polymerizable composition comprising for example an alternative deposition of a voxel of polymerizable composition comprising monomer (A1) and monomer (B1) and a voxel of polymerizable composition comprising monomer (A2) and monomer (B2), may advantageously presented optimize properties as refractive index or mechanical properties. Then it is an embodiment of the invention, wherein voxels comprise different polymerizable compositions such that some voxels comprise a first polymerizable composition comprising monomer or oligomer (A) and monomer (B), and some other voxels comprise a different polymerizable composition comprising a monomer or oligomer (A') and monomer (B'), (A') being chemically different than (A), and (B') being chemically different than (B).

"Ophthalmic lens", according to the invention, is defined as lens adapted namely for mounting in eyeglasses whose function is to protect the eye and/or to correct vision; this lens is selected from the afocal, unifocal, bifocal, trifocal, and progressive lens. Then it is understood that ophthalmic lens may be corrective or un-corrective. Eyeglasses wherein ophthalmic lens will be mounted could be either traditional frame comprising two distinctive ophthalmic lenses, one for the right eye and one for the left eye, or like mask, visor, helmet sight or goggle, wherein one ophthalmic lens facing simultaneously the right and the left eyes. Ophthalmic lens manufactures by a method of the invention may be produces with traditional geometry as a circle or may be produced to be fitted to the frame intended. The present invention presents a great advantage to manufacture directly a three-dimensional ophthalmic lens in accordance with the geometry of the frame for which said ophthalmic lens is dedicated.

Ophthalmic lens manufacture in accordance with a method of the invention can furthermore be functionalized, in a further step after optionally post-treatment step, by adding at least a functional coating and/or a functional film. Functionalities may be added on one face of the ophthalmic lens, or on the two faces of ophthalmic lens, and on each faces, functionalities may be identical or different. Among the functionality, it may be mentioned, as example and without any limitation a functionality selected from anti-impact, anti-abrasion, anti-soiling, anti-static, anti-reflective, anti-fog, anti-rain, self-healing, polarization, tint, photochromic, selective wavelength filter which could be obtain through an absorption filter or reflective filter. Such selective wavelength filters are particularly interested to filter ultraviolet radiation, blue light radiation, or infra-red radiation for example.

The functionality may be added by at least one process selected from dip-coating, spin-coating, spray-coating, vacuum deposition, transfer process or lamination process. By transfer process it is understood that functionality is firstly deposited on a support like a carrier, and then is transferred from said carrier to said ophthalmic lens through an adhesive layer deposited between the two elements. Lamination is defined as obtaining a permanent contact between a film which comprises at least one functionality as mentioned hereinbefore and the surface of the ophthalmic lens to be treated, said permanent contact being obtained by the establishment of a contact between said film and said lens, followed optionally by a polymerization step or a heating step, in order to finalize the adhesion and adherence between the two entities. At the end of this lamination process the assembled film and the optical lens form one single entity. Usually to lamination process, glue is present in the interface of the film and the ophthalmic lens.

Ophthalmic lens manufacture by a method of the present invention should present the following characteristics: a high transparency with an absence of or optionally a very low light scattering or haze, a high Abbe number of greater than or equal to 30 and preferably of greater than or equal to 35, in order to avoid chromatic aberrations, a low yellowing index and an absence of yellowing over time, a good impact strength (in particular according to the CEN and FDA standards), a good suitability for various treatments (shock-proof primer, anti-reflective or hard coating deposition, and the like) and in particular good suitability for colouring, a glass transition temperature value preferably of greater than or equal to 65° C. and better still of greater than 90° C. Haze is the percentage of transmitted light that, in passing through specimen, deviates from the incident beam by forward scattering. Only light flux deviating more than 2.5° on the average is considered to be haze.

On other word, Haze is a measure of intensity of the transmitted light that is scattered more than 2.5°. It appears as a milky, smoky, hazy field when looking through a packaging material. Low values are a measurement of low "haze". As haze increases, loss of contrast occurs until the object cannot be seen. Usually an ophthalmic lens could present a haze level less than 1.

EXAMPLES

Example 1

In a first example a polymerizable composition comprised: 3,9-dimethylene-1,5,7,11-tetraoxaspiro[5.5]undecane, (DMSOC) (a free radically polymerizable expanding monomer as monomer (B)) added to compensate for shrinkage of the other curable components; 2,2 bis[p-(2'-hydroxy-3-methacryloxypropoxyphenyl)] propane, (bis-GMA(A)), which is the base resin for the optical part to be manufactured; Triethyleneglycol dimethacrylate (TEGDMA), added as a low viscosity reactive diluent; N,N'-dimethyl-p-toluidine used as a free radical accelerator (promoter); and dicumyl peroxide is used to cure the epoxy and as the free radical catalyst (photoinitiator) to polymerize the DMSOC and other acrylates, as described in Table 1 below. This formulation, when blended and cured versus a control not containing the expanding monomer, showed no shrinkage vs. the control that showed approximately 5% shrinkage due to the low shrinkage monomers chosen.

TABLE 1

| Material | % by wt. DMSOC/acrylic | % by wt. Acrylic Control |
|---|---|---|
| Bis GMA acrylated epoxy | 61.3 | 72.2 |
| DMSOC expanding monomer | 14.7 | — |
| TEGDMA | 20.0 | 25.0 |
| N,N'-dimethyl-p-toluidine | 1.3 | 1.3 |
| dicumylperoxide | 3.0 | 3.0 |

Example 2

In a second example, a polymerizable composition comprises: at least a first quantity of 3,9-dimethylene-1,5,7,11-tetraoxaspiro[5.5]undecane (DMSOC), (known to expand 4.3% at room temperature and 7% at a temperature just below its melting point of 70° C.) as the expanding monomer (B); to which is added diethyleneglycol bis allylcarbonate (A), which is the base resin for the manufacture of the optical part and (known to copolymerize with DMSOC); dicumyl peroxide, as a free radical photoinitiator used for curing; and N,N'-dimethyl-p-toluidine as a free radical accelerator, used to reduce the time and energy needed to reach maximum cure, as described in Table 2 below. With said blended composition, after depositing voxels to a desired amount, voxels are partially polymerized with or without induced diffusion, such as by thermal diffusion; after which free radical polymerization is induced and viscosity is unchanged versus that of the control not containing the expanding monomer which exhibits approximately 14% shrinkage. The resulting 3D polymer, exhibits good optics and geometry.

TABLE 2

| Material | % by wt. DMSOC/acrylic | % by wt. Acrylic Control |
|---|---|---|
| Allyl diglycolcarbonate | 80.4 | 95.3 |
| DMSOC expanding monomer | 14.9 | — |
| N,N'-dimethyl-p-toluidine | 1.3 | 1.3 |
| Benzoyl peroxide | 3.4 | 3.4 |

Example 3

In a third example, a polymerizable composition included: a first quantity of the bicyclic monomer, 3,9-di(5-norbornene-2,2)-1,5,7,11-tetraoxaspiro(5,5)undecane, (NSOC), a white crystalline solid expanding monomer (B), with addition of Diglycidyl ether of bisphenol A epoxy (UVR-6110 from Dow Chemical) (A1); and with the addition of Bis (3, 4-Epoxycyclohexylmethyl) adipate (UVR-6128 from Dow Chemical) (A2) as the low shrinkage base monomers for the optical part, with Omicure BC-120 (Boron trifluoride adduct) and Omicure DDA-5 (Dicyandiamide) as curing agents, as described in Table 3 below. When blended in a monomer ratio of 49.8% UVR-6110 to 25.5% UVR-6128 to 19.7% NSOC, there was no volume change during cure.

TABLE 3

| Material | % by wt. NSOC/Epoxy | % by wt. Epoxy control |
|---|---|---|
| Diglycidyl ether of bisphenol A (UVR-6110) | 49.8 | 62.9 |
| Bis(3,4-Epoxycyclohexyl methyl) adipate (UVR-6128) | 25.5 | 32.1 |
| NSOC expanding monomer | 19.7 | — |
| Omicure BC-120 (Boron trifluoride adduct) | 2.5 | 2.5 |
| Omicure DDA5 (Dicyandiamide) | 2.5 | 2.5 |
| Shrinkage (density change) | ~0% | 5-10% |

Example 4

In a fourth example a polymerizable composition included: 3,4-Diepoxycylcohexane, the base resin for the optical part to be manufactured (A1); 5 mol % the expanding monomer Tetraspiroorthocarbonate, (TETRASOC) (B); 2 mol % of Triarylsulfoniumhexafluoroantimonate, a cationic photoinitiator to photo-cure the epoxy; with Cyclohexanol, 4,4'-(1-methylethylidene)bis-, polymer with (chloromethyl)oxirane (Eppaloy 5001) (A2), the second part of the base resin; as described in Table 4 below, the co-polymer exhibited no shrinkage upon polymerization and therefore, the epoxy retained most of its typical mechanical properties.

TABLE 4

| Material | % by wt. NSOC/Epoxy | % by wt. Epoxy control |
|---|---|---|
| 3,4-Diepoxycyclohexane | 73.0 | 78.0 |
| Cyclohexanol, 4,4'-(1-methylethylidene)bis-, polymer with(chloromethyl)oxirane (Eppaloy 5001) | 20.0 | 20.0 |
| Tetraspiroorthocarbonate (TETRASOC) | 5.0 | — |
| Triarylsulfonium hexafluoroantimonate | 2.0 | 2.0 |
| Shrinkage (density change) | ~0% | ~5% |

The co-polymer exhibited no shrinkage upon polymerization and therefore, the epoxy retained most of its typical mechanical properties. Therefore, the present invention is well adapted to attain the ends and advantages mentioned as well as those that are inherent therein.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

The invention claimed is:

1. A method of manufacturing an ophthalmic lens, wherein a polymerizable composition is manufactured by an additive manufacturing process,
   wherein the polymerizable composition comprises at least:
   a monomer or oligomer (A) comprising at least one reactive group further defined as an epoxy, thioepoxy, epoxysilane, (meth)acrylate, thio(meth)acrylate, vinyl, urethane, thiourethane, isocyanate, mercapto, or alcohol group, wherein the monomer or oligomer (A) shrinks during polymerization; and
   a monomer (B) comprising at least a non-aromatic cyclic group wherein during polymerization the cyclic group opens and reacts with another molecule of monomer (B) and/or with a reactive group of monomer or oligomer (A), wherein the monomer (B) expands during polymerization,
   wherein the additive manufacturing process comprises:
   1) constituting voxels of the polymerizable composition;
   2) increasing viscosity of at least the constituted voxel;
   3) optionally inter-diffusing at least a voxel, wherein viscosity is increased, into another voxel, through a physical and/or a chemical treatment; and
   4) repeating 1), 2), and, optionally 3) in a same or different order according to reactive groups involved in monomer (A) and monomer (B) of the polymerizable composition to form a transparent ophthalmic lens.

2. The method of claim 1, wherein each voxel comprises the same polymerizable composition comprising at least a monomer or oligomer (A) and a monomer (B).

3. The method of claim 1, wherein voxels comprise different polymerizable compositions such that some voxels comprise a first polymerizable composition comprising monomer or oligomer (A) and monomer (B), and some other voxels comprise a different polymerizable composition comprising a monomer or oligomer (A') and monomer (B'), wherein (A') is chemically different than (A), and (B') is chemically different than (B).

4. The method of claim 1, wherein increasing the viscosity comprises:
   a crosslinking process, which is initiable by cationic reaction, by free radical reaction or by condensation reaction by applying activating light or thermal treatment to liquid composition;
   an evaporation process; and/or
   a process consisting of submitting a liquid composition to a temperature which is below the temperature used at the deposition step of the voxel.

5. The method of claim 4, wherein increasing the viscosity comprises evaporation of a solvent comprised in a liquid composition.

6. The method of claim 1, wherein inter-diffusing comprises:
   spontaneous inter-diffusion; and/or
   induced inter-diffusion, via a process comprising exposure to radiation, mechanical agitation, decrease of molecular mass of voxel, and/or exposure to a solvent.

7. The method of claim 1, further comprising applying at least one post-treatment to improve homogenization of the transparent ophthalmic lens.

8. The method of claim 7, wherein the post-treatment step comprises at least one of:
- a crosslinking process initiated by cationic reaction, free radical reaction, or a condensation reaction by applying activating light or thermal treatment to the liquid composition;
- an annealing process; and/or
- a drying process by thermal treatment or solvent extraction.

9. The method of claim 1, wherein the additive manufacturing process comprises a 3D printing process or a stereolithography process.

10. The method of claim 1, further comprising:
adding at least one functional coating and/or a functional film, on at least one face of the ophthalmic lens.

11. The method of claim 10, wherein the functionality of the coating and/or the film is further defined as impact resistance, anti-abrasion, anti-soiling, anti-static, anti-reflective, anti-fog, anti-rain, self-healing, polarization, tint, photochromic, and/or selective wavelength filter further defined as an absorption filter, a reflective filter, an interferential filter and/or a combination thereof.

12. The method of claim 1, wherein the transparent ophthalmic lens is further defined as a blank lens, a semi-finished lens, a finished lens, or a lens adapted to a see-through head-mounted display.

13. The method of claim 12, wherein:
the transparent ophthalmic lens is further defined as an afocal, unifocal, bifocal, trifocal, or progressive lens;
the ophthalmic lens is adapted for mounting to either a traditional frame comprising two distinctive ophthalmic lenses, one for a right eye and one for a left eye, or to a mask, visor, helmet sight or goggle, wherein one ophthalmic lens faces simultaneously a right and a left eye; and/or
the ophthalmic lens has a round geometry or a geometry fitted to the geometry of an intended frame.

14. The method of claim 1, wherein monomer or oligomer (A) comprises from 99% to 1% by weight of the total weight of polymer composition and monomer (B) comprises from 99% to 1% by weight of the total weight of the polymer composition.

15. The method of claim 1, wherein monomer (B) is a cyclic group that is monocyclic or polycyclic, substituted or unsubstituted, without aromaticity properties, and further defined as a cyclic sulfate, spiroorthoester, bicyclic-ortho ester, cyclic carbonate, spiroorthocarbonate, bicyclic ketal lactone, and/or combination thereof.

16. The method of claim 1, wherein at least part of a reactive group of monomer or oligomer (A) reacts with at least part of a reactive group of monomer (B) after the opening of the cyclic group, to form a copolymer of monomer (A) and (B) during polymerization process.

17. The method of claim 1, wherein:
the reactive group of monomer or oligomer (A) reacts only with a reactive group of another molecule of monomer or oligomer (A) to form a homopolymer (A) during polymerization process; and
the reactive group resulting from the opening of the cyclic part of monomer (B) reacts only with the reactive group of another molecule of monomer (B) to form a homopolymer (B) during polymerization process.

18. The method of claim 1, wherein the polymerizable composition comprises an amount of monomer (B) to reduce the shrinkage of the composition to less than 5%.

19. The method of claim 1, wherein the polymerizable composition further comprises a polymerization initiator defined as a photo-initiator, a thermal initiator, or a combination thereof.

20. The method of claim 1, wherein the polymerizable composition comprises at least one further additive defined as a co-initiator, inhibitor, dye, pigment, UV absorber, fragrance, deodorant, surface active agent, surfactant, binder, antioxidant, optical brightener, and/or anti-yellowing agent.

* * * * *